United States Patent Office 3,275,577
Patented Sept. 27, 1966

3,275,577
PREPARING FOAMS OF POLYPROPYLENE-
BUTENE-1 COPOLYMERS
Donald F. Hoeg, Mount Prospect, Ill., and Samuel Liebman, Silver Spring, Md., assignors to W. R. Grace & Co., New York, N.Y., a corporation of Connecticut
No Drawing. Filed Feb. 25, 1963, Ser. No. 260,833
4 Claims. (Cl. 260—2.5)

The present invention relates to foamed synthetic polymers and more specifically to a novel method for preparing useful foams of propylene-butene-1 copolymers.

The prior art discloses numerous methods for preparing foams of polymeric olefins. Many of these methods involve incorporation of an expandable blowing agent which is activated by physical or chemical means. Other methods involve the direct mechanical incorporation of a gas through vigorous mechanical agitation or pressure injection. More recently, it has been proposed that controlled degradation of a polymeric substrate with high energy irradiation may be used to induce foam formation through the liberation of hydrogen within the polymer.

The inherent drawbacks possessed by most prior art methods is that they require the addition of an auxiliary blowing agent and/or the use of relatively complex and expensive processing procedures. A simplified method for producing foamed polymers, particularly foamed polymeric olefins, would represent a useful and substantial improvement in the art.

It is, therefore, an object of the present invention to provide an improved method for preparing foams of propylene-butene-1 copolymers.

It is another object to provide a method whereby useful propylene-butene-1 foams may be prepared without the use of auxiliary blowing agents and/or complex processing methods.

It is a further object to provide a novel one step process whereby monomeric propylene and butene-1 may be directly copolymerized to form a useful synthetic expanded material.

These and still further objects of the present invention will become readily apparent to one skilled in the art from the following detailed description and specific examples.

We have found that if a certain ratio of monomeric propylene and butene-1 are copolymerized in the presence of a conventional organometallic polymerization catalyst to a certain degree of polymerization a useful foamed copolymer may be directly obtained from the polymerization mass upon release of the non-polymerized propylene and butene-1.

More specifically, our invention contemplates a method for producing propylene-butene-1 copolymer foams which comprises copolymerizing a mixture containing from 55 to 75 mole percent propylene and from 45 to 25 percent butene-1 in the presence of a conventional organometallic polymerization catalyst until from about 15 to about 75 percent of the monomeric propylene and butene-1 are copolymerized, and subsequently removing the unpolymerized propylene and butene-1 from the polymerization mixture whereby instantaneous foaming of the propylene-butene-1 copolymer takes place.

Catalysts which may be used in the practice of the present invention are well known to those skilled in the art and are fully disclosed in U.S. Patent 3,014,016 to Natta et al. Broadly speaking, catalysts which may be used in the practice of the present invention, comprise a compound of a transition metal of the 4th to 6th group of the periodic table, such as titanium chloride, and an alkyl compound of a metal of the second or third column of the periodic table such as triethyl aluminum. The transition metal compound used in the catalyst is a halide of titanium, zirconium, hafnium, thorium, vanadium, tantalum, niobium, chromium, molybdenum, tungsten, or uranium in which the metal has the lower valence. The organometallic compound comprises an alkyl or monohaloalkyl compound of a metal of the first third columns of the periodic table i.e. lithium from the first column, beryllium, magnesium, zinc and other metals of the second group, and aluminum, gallium, and other elements of the third group. The valencies of these metals from the first to third column of the periodic table are linked to the same or different lower alkyl radicals having 2 to 4 carbon atoms such as ethyl, propyl and butyl radicals. One valence of the metal may be satisfied by halogen. Typical metal-alkyls include triethyl aluminum, monochlorodialkyl aluminum, diethyl zinc, etc.

The mole ratio of catalyst components will range from about 10 to about 0.5 moles of organometallic compound per mole of transition metal halides. The amount of the catalyst composition used in the polymerization as a practical matter ranges from about 0.5 to about 2.0 parts by weight catalyst composition per thousand parts by weight of olefin (propylene plus butene-1) subjected to polymerization. In general the rate of polymerization is proportional to the catalyst concentration. Thus there is no absolute maximum of catalyst that may be used outside of practical economic limitations.

The ingredients of the catalyst composition, that is, halide of the transition metal and the organometallic compounds may be added individually to the polymerization mixture or they may be first combined in the presence of an inert hydrocarbon solvent such as pentane, heptane, iso-octanes or anhydrous benzene and then added to the polymerization mixture after removal of the inert solvent. Preferably, however, the transition metal halide is injected into the reaction in a stream of inert gas. Then the desired amount of olefins are added, and the mixture is heated to reaction temperature. The organometallic compound is then injected under pressure into the reaction mixture to initiate the reaction.

As mentioned previously, the ratio of monomeric propylene to butene-1 must be in range from 55 to 75 mole percent propylene. Exceeding the amount of propylene above about 75 mole percent results in a copolymer which is apparently too hard to foam satisfactorily. On the other hand, when the amount of propylene is dropped below about 55 mole percent the copolymer becomes too rubbery for the preparation of a stable foam material.

The polymerization is carried out at a temperature below the melting point of the resultant copolymer. Ordinarily, the temperatures used in the present invention will range from about 50° C. up to about 85° C. which is below the critical temperature of propylene.

The polymerization is preferably carried out under autogenous pressure conditions. That is, the pressure maintained within a closed reactor will be that generated by the reactants maintained at the above specified reaction temperatures. Normally, if the reaction is initiated at about 50° C. the initial pressure within the reactor will be about 20.2 atmospheres.

The polymerization is continued till up to about 75% by weight of the monomeric materials have been polymerized, and preferably after from about 15 to about 50% conversion to polymer has been achieved. To attain this percentage conversion at the temperatures specified above from about ½ to about 3 hours are required, using a batch type process. After the desired conversion to polymer has taken place, the non-polymerized butene-1 and propylene is removed by reducing the pressure over the reaction mass. Normally, this merely involves venting the polymerization reactor to the atmosphere after a desired reaction has taken place. This venting of the monomer at the temperature of the polymerization substantially stops the reaction through removal of the reactive specie.

was carried out using the reaction conditions set forth in the table below and the procedure of Example 1.

PERIODIC TABLE

| Run | C₃H₆ (g.) | C₄H₈ (g.) | TiCl₃ (g.) | DEAC¹ (cc.) | H₂ (p.s.i.) | Temp. (° C.) | Time (min.) | Pressure (p.s.i.) | | Percent yield |
|---|---|---|---|---|---|---|---|---|---|---|
| | | | | | | | | Start | Final | |
| 1 | 489.3 | 652.4 | 0.70 | 2.67 | 15 | 65 | 60 | 260 | 235 | 20 |
| 2 | 785.0 | 261.0 | 0.77 | 2.95 | 15 | 65 | 60 | 325 | 345 | 23 |
| 3 | 537.1 | 587.6 | 0.75 | 2.90 | 21 | 65 | 60 | 275 | 285 | 21 |
| 4 | 735.2 | 326.1 | 0.70 | 2.70 | 7.5 | 65 | 60 | 315 | 325 | 19 |

¹ DEAC=diethylaluminum monochloride.

The present reaction may be advantageously moderated by using the small amount of hydrogen as a chain stopping agent. The presence of from about 0.5 to about 2.0 atmospheres of free hydrogen in an olefin polymerization reaction will regulate the molecular weight of the final polymer and result in a desired molecular weight in the end product. Using this innovation, hydrogen is normally admitted to the reactor under a partial pressure of from about 0.5 to about 2.0 atmospheres as measured at room temperature. The preferred method of admitting the hydrogen is to admit the desired partial pressure into the reaction mixture before the initial polymerization takes place at room temperature (about 25° C.).

The polymeric materials obtained in the reaction are foamed materials. These materials find utility as structural elements when extruded in the form of boards, rods, etc. Such extrusion may be achieved by directly extruding the final reacted mass through a die after the desired polymerization has taken place and permitting the excess monomer to evaporate from the extruded mass during extrusion. Suitable dies must be used during the extrusion to contain the expanding mass and obtain the desired shape.

Having described the essential basic aspects of the invention, the following specific examples are given to illustrate embodiments thereof.

EXAMPLE 1

A 0.74 gram sample of 3TiCl₃·AlCl₃ was placed in a one gallon stainless steel batch reactor through which is maintained a protective blanket of nitrogen. 16.3 moles of liquid propylene were directed under pressure into the reactor along with 7.0 moles of butene-1. To this reaction mixture was added the partial pressure of hydrogen of 7.5 p.s.i. as measured at room temperature. The reaction mixture was then heated to 67° C. whereupon 2.85 cc. of diethyl aluminum monochloride was blown into the reactor under pressure. The reaction mixture was constantly agitated for one hour whereupon the reaction pressure within the reactor was 350 p.s.i. The nonreacted monomers were then vented to the atmosphere and the reaction product was removed from the reactor as a rigid stable foam structure. The polymeric material weighed 194 grams which represented an 18% conversion of monomer to polymer.

EXAMPLE 2

To illustrate the criticality of the ratio of monomers specified herein, namely 55–75 mole percent propylene, and 45–25 mole percent butene-1, the following example In run number 1, wherein 50 mole percent propylene was used, a polymer was obtained which was slightly too rubbery to foam satisfactorily. On the other hand, in run number 2 wherein 80 percent propylene was used, a hard granular material which was somewhat too solid to foam was obtained.

Runs 3 and 4, wherein 55 and 75 mole percent propylene were used, yielded a foam product having satisfactory characteristics.

The above specific example clearly shows that using the ratios of propylene to butene-1 specified herein, a foamed polyolefin product may be obtained without the use of auxiliary blowing agents.

We claim:

1. A method for preparing foams of propylene-butene-1 copolymers which comprises polymerizing a mixture comprising from about 55 to about 75 mole percent propylene and from about 45 to about 25 mole percent butene-1 in the presence of a catalyst mixture comprising a halide of a transition metal of the fourth to sixth groups of the periodic table and a lower alkyl-metallic compound of a metal of the second to third column of the periodic table at a temperature of from about 50 to about 85° C. until from about 15 to about 75% by weight of said propylene-butene-1 is copolymerized, and removing the unpolymerized propylene and butene-1 from the polymerization mixture by evaporation through release of pressure to form a stable foamed propylene-butene-1 copolymer.

2. The method of claim 1 wherein said alkyl-metallic compound is diethylchloroaluminum, and the transition metal halide is 3TiCl₃·AlCl₃.

3. The method of claim 1 wherein said reaction is carried out under a partial pressure of hydrogen ranging from about 0.5 to about 2.0 atmospheres as measured at 25° C.

4. The method of claim 1 wherein the polymerization is carried out substantially at autogenous pressure within a closed reaction vessel.

References Cited by the Examiner

UNITED STATES PATENTS 3,014,016   12/1961   Natta et al. _____ 260—93.5

OTHER REFERENCES

Mazzanti et al., Anionic Coordinated Copolymerization of Propylene With 1-Butene, Chim e Industria 42, 468–476.

MURRAY TILLMAN, *Primary Examiner.*

N. E. OBLON, *Assistant Examiner.*